US011863988B2

(12) United States Patent
Bouilloux

(10) Patent No.: US 11,863,988 B2
(45) Date of Patent: Jan. 2, 2024

(54) PORTABLE, AUTONOMOUS AND SECURE MICRO-SERVER FOR COLLABORATION BETWEEN DIFFERENT USERS

(71) Applicant: AWACLOUD, Paris (FR)

(72) Inventor: Matthieu Bouilloux, Yvette (FR)

(73) Assignee: TOWARDS CONSEIL, Nanterre (FR)

( * ) Notice: Subject to any disclaimer, the term of this patent is extended or adjusted under 35 U.S.C. 154(b) by 176 days.

(21) Appl. No.: 17/437,029

(22) PCT Filed: Feb. 27, 2020

(86) PCT No.: PCT/FR2020/050385
§ 371 (c)(1),
(2) Date: Sep. 7, 2021

(87) PCT Pub. No.: WO2020/178503
PCT Pub. Date: Sep. 10, 2020

(65) Prior Publication Data
US 2022/0182834 A1    Jun. 9, 2022

(30) Foreign Application Priority Data

Mar. 6, 2019 (FR) ........................................ 1902295

(51) Int. Cl.
*H04W 12/102* (2021.01)
*H04W 12/03* (2021.01)
*H04W 12/08* (2021.01)

(52) U.S. Cl.
CPC ......... *H04W 12/102* (2021.01); *H04W 12/03* (2021.01); *H04W 12/08* (2013.01)

(58) Field of Classification Search
CPC . H04W 24/02; H04W 84/042; H04W 84/045; H04W 84/102; H04W 84/12;

(Continued)

(56) References Cited

U.S. PATENT DOCUMENTS 9,886,983 B1 * 2/2018 Fairchild .............. G11B 33/124
2009/0055408 A1   2/2009 Warren et al.
(Continued)

OTHER PUBLICATIONS

Shrivastava, et al., "Home Server and NAS using Raspberry Pi," 2017 Intl. Conference on Advances in Computing . . . , Sep. 13, 2017.

*Primary Examiner* — Wayne H Cai
(74) *Attorney, Agent, or Firm* — CRGO Global; Steven M. Greenberg

(57) ABSTRACT

The invention relates to a portable, autonomous and secure micro-server (10) for collaboration between different users, comprising: a central processor (11); a random-access memory (12); a storage space (13) for computer files; an operating system (32) configured to be able to control said central processor (11), said random-access memory (12) and said storage space (13), characterized in that it further comprises: a first controller for wireless access to said micro-server, called the sharing network controller (14); a second controller for wireless access to said micro-server, called the configuration network controller (15); a management module (16) for managing packets from an IP network layer, said management module being embedded in said operating system (32) and configured to enable the use of a network service that enables files to be supplied from the storage space to a network service hosted by a device (21, 22) of a user connected to said micro-server via said sharing controller (15); a data encryption module (17), configured to be able to encrypt, using a predetermined encryption key, all the data passing through said random-access memory (12) before said data are saved in said storage space (13).

7 Claims, 1 Drawing Sheet

(58) Field of Classification Search
CPC ..... H04W 88/18; H04W 12/03; H04W 12/08; H04W 12/102
See application file for complete search history.

(56) References Cited

U.S. PATENT DOCUMENTS

| | | |
|---|---|---|
| 2009/0176529 A1 | 7/2009 | Warren et al. |
| 2014/0259182 A1* | 9/2014 | Mershon ................. G06F 21/10 726/28 |
| 2015/0358297 A1* | 12/2015 | Endahl ................. H04L 9/0825 713/168 |
| 2016/0147609 A1* | 5/2016 | Wallace ................ G06F 16/128 707/647 |
| 2016/0254031 A1* | 9/2016 | Noguchi ................. G11C 5/04 365/185.08 |

\* cited by examiner

[Fig. 1]
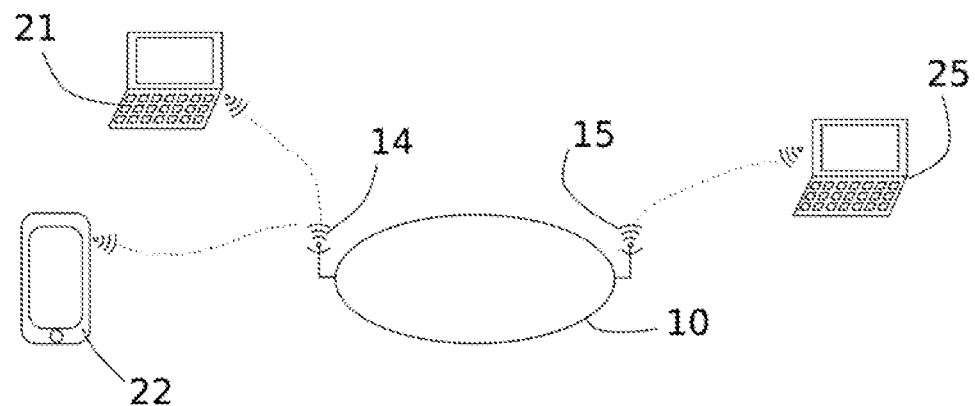
[Fig. 2]
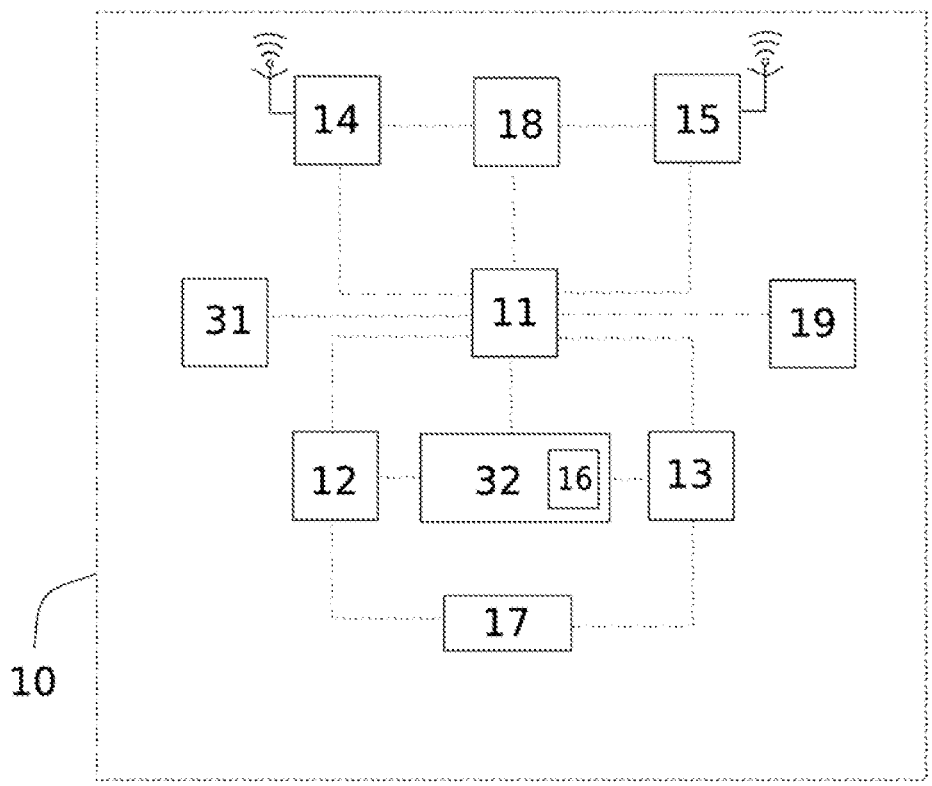

PORTABLE, AUTONOMOUS AND SECURE MICRO-SERVER FOR COLLABORATION BETWEEN DIFFERENT USERS

CROSS-REFERENCE TO RELATED APPLICATIONS

This application is a § 371 national phase entry of International Application No. PCT/FR2020/050385, filed Feb. 27, 2020, which claims priority to French Patent Application No. 1902295, filed Mar. 6, 2019.

TECHNICAL FIELD OF THE INVENTION

The invention relates to a portable, autonomous, and secure micro-server intended to facilitate the exchange of computer files between different users. The invention relates more specifically to a portable micro-server intended for professionals on the move.

TECHNICAL BACKGROUND

One of the difficulties frequently encountered by professionals on the move (hereinafter referred to as users) concerns the lack of a network allowing them to connect to a remote server (for example an e-mail server, a file server or, more generally, any type of company server) or the lack of a secure network when a public network, such as a Wi-Fi network, is available.

In the event that a public network is available, it is known to use a virtual private network, better known by the acronym VPN, which makes it possible to establish a secure connection between two different local networks by means of data encapsulation from the first network protocol into the second network protocol, which is located in the same layer of the layered model or in a higher-level layer. However, in the event that the VPN network is not accessible, the content of the server is unusable and the professional finds themselves unable to carry out their task or to establish secure access to the requested information.

In addition, it is common for the network available in a company meeting room to be dedicated only to company employees and therefore cannot be used by an external consultant visiting the company. The solution then often involves using a 3G or 4G card as a means of accessing the Internet and/or the professional's remote server.

Another difficulty frequently encountered by a professional on the move concerns the incompatibility between the devices used by the professional and those of their interlocutors, making collaborative developments difficult, if not impossible. For example, it is often the case that the devices used by the various participants in a meeting are not compatible, and therefore the files exchanged cannot be correctly read and interpreted by all users and/or projected with the technical means available, unless the professional takes with them an assortment of connectors or connection equipment designed to allow operational compatibility with the devices and operating systems installed on said devices.

Throughout the text, "computer device" designates a machine configured to read computer files, that is to say files formed of a set of digital codes that can be directly interpreted by a machine, such as a computer, a cell phone, a digital tablet, etc. Such computer files are, for example, textual documents, images, audio clips, video content, compressed documents, three-dimensional visualization documents, executable programs, machine files, historical files, databases, etc. Throughout the text, the term "data" is also used to designate a computer file.

Finally, if cloud storage of data becomes more generalized such that a professional can access their files from different separate devices, this would mean that the files are spread across different devices, which can pose security and confidentiality problems, making access control difficult, if not impossible, to guarantee.

A solution is therefore needed which makes it possible to simplify and ease the mobility of professionals, to strengthen the security of data used by a professional on the move, and to improve the collaborative work of the professional on the move.

Aims of the Invention

The invention aims to provide a portable micro-server that makes it possible to overcome the problems of operational compatibility of computer devices encountered by professionals on the move.

In at least one embodiment of the invention, the invention also aims to provide a portable micro-server that makes it possible to facilitate collaboration between users.

In at least one embodiment of the invention, the invention also aims to provide a portable micro-server that makes it possible to guarantee the security of file exchanges between the users.

In at least one embodiment of the invention, the invention also aims to provide a portable micro-server that makes it possible to guarantee the security and integrity of the computer files exchanged.

In at least one embodiment of the invention, the invention also aims to provide a portable micro-server that has a degree of autonomy that is compatible with the mobility needs of the users.

In at least one embodiment of the invention, the invention also aims to provide a portable micro-server that can operate even when there is no Internet access network.

DISCLOSURE OF THE INVENTION

To this end, the invention relates to a portable, autonomous, and secure micro-server for collaboration between different users, comprising:
  a central processor,
  a random-access memory,
  a storage space for computer files,
  an operating system configured to be able to control said central processor, said random-access memory, and said centralized storage space.

A micro-server according to the invention is characterized in that it further comprises:
  a first controller for wireless access to said micro-server, called the sharing network controller, configured to create a wireless local sharing network and, upon authorization, to allow a computer device of a user to be connected to said micro-server via the wireless local sharing network,
  a second controller for wireless access to said micro-server, called the configuration network controller, configured to create a wireless local configuration network and, upon authorization, to allow a computer device of a privileged user to be connected to said micro-server via the wireless local configuration network to automatically synchronize predetermined files from a device of said privileged user on said centralized storage space of said micro-server via said random-access memory, a management module for managing packets from an IP network layer, said management module being embedded in said operating system and configured to enable the use of a network service of a layer higher than said IP network layer which enables files to be supplied from the storage space to said network service hosted by a device of a user connected to said micro-server via said sharing controller, a data encryption module, configured to be able to encrypt, using a predetermined encryption key, all the data passing through said random-access memory before said data are saved in said storage space.

In other words, the invention relates to a computer device of a new type, designated throughout the text by the term "micro-server", which incorporates all the solutions required for solving the problem of freeing the mobile user of the material and network conditions while also guaranteeing data security and confidentiality of data exchanges in order to provide said user with a collaboration solution that is autonomous, secure, and compatible with the constraints of mobility.

A micro-server according to the invention therefore makes it possible to overcome the operational compatibility problems of computer devices encountered by professionals on the move by virtue of the presence of a management module for managing the packets of the IP network layer, said management module being embedded in the operating system and configured to enable the use of a higher-layer network service, such as a web server or a remote network drive, or any equivalent network service, which makes it possible to deliver content, for example to a web browser or a file system of a device of a user connected to the micro-server, via the sharing network controller. In other words, the sharing network controller enables an authorized user to connect a device to the micro-server by creating a wireless local sharing network that allows said device to be connected. The micro-server can thus deliver content to any user connected to the micro-server, in particular web content that is accessible via a web browser, thus ensuring perfect operational compatibility between the devices connected to the micro-server without requiring additional equipment and without prior configuration or installation on the user devices.

The sharing network controller advantageously uses the IEEE 802.11 wireless local area network protocol, commonly referred to as Wi-Fi, thus constituting a Wi-Fi sharing controller.

In addition, the micro-server according to the invention allows collaboration between different devices, including in the absence of an Internet network. In particular, the sharing network controller and the presence of a data storage space allow documents to be accessed by and shared between the devices of the users connected to the micro-server. In other words, the micro-server according to the invention generates its own wireless network that allows devices to be connected.

The computer files saved on the storage space of the micro-server are protected by the presence of a data encryption module that is configured to be able to encrypt all the data passing through the random-access memory of the micro-server before said data are saved to the storage space. In other words, any content which passes through the random-access memory of the micro-server is encrypted by the encryption module. In addition, all the documents saved in the storage space by a privileged user, i.e., in practice, by the professional on the move who owns the micro-server, are automatically encrypted by the encryption module, such that a possible loss of the micro-server does not jeopardize the data security of the professional on the move.

Throughout the text, the term "module" denotes a software component, i.e. a subset of a software program, which can be compiled separately, either for independent use or to be assembled with other modules of a program, or a hardware component, or a combination of a hardware component and a software subprogram. A hardware component of this kind may comprise an integrated circuit specific to an application (better known under the acronym ASIC for application-specific integrated circuit) or a programmable logic circuit (better known under the acronym FPGA for field-programmable gate array) or a dedicated microprocessor circuit (better known by the acronym DSP for digital signal processor) or any equivalent hardware. In general, a module is therefore a (software and/or hardware) component that enables a function to be performed.

According to the invention, an encryption key is stored in encrypted form in the dedicated memory. This key is decrypted upon start-up of the micro-server according to the invention by means of the identifiers of the user and placed in the random-access memory.

According to one embodiment of the invention, said encryption module is formed of an electronic component of the TPM chip type.

A micro-server according to the invention also makes it possible to automatically synchronize the storage of computer files (or data) from a device of a privileged user on the micro-server by virtue of the presence of the configuration network controller, which, upon authorization, allows the computer device of said privileged user to be connected to said micro-server. This synchronization necessarily involves encryption of the data which pass through the random-access memory of the micro-server.

The configuration network controller advantageously uses the IEEE 802.11 wireless local area network protocol, commonly referred to as Wi-Fi, thus constituting a Wi-Fi configuration controller.

The invention therefore makes it possible to configure the micro-server by securely storing therein the data which can then be shared with user devices that connect to the micro-server via the sharing controller.

Advantageously and according to the invention, the micro-server further comprises a rechargeable battery for powering said processor and said configuration and sharing network controllers.

A micro-server according to this advantageous variant is autonomous and allows secure collaboration between users, including in the absence of a nearby electrical network. Preferably, the micro-server further comprises a charger component configured to make it possible to monitor the battery recharging process on the power grid. The charging measurement allows the privileged user to know the remaining availability of the battery and therefore the autonomy of the micro-server until the next charging cycle.

Advantageously and according to the invention, the micro-server further comprises a time-stamping module for said micro-server.

A micro-server according to this variant makes it possible to equip said micro-server with cryptographic time-stamping functions, such as digital signatures, proof of existence, and solutions based on digital certificates.

Advantageously and according to the invention, the micro-server further comprises means for authenticating the connections of the devices of the users soliciting said sharing network controller.

These authentication means may be of any type. It involves, for example, authentication by password, by serial number of the device seeking to connect to the micro-server, by biometric information of the user, etc.

Advantageously and according to the invention, the micro-server comprises a centralized storage space having a capacity of 128 GB.

Of course, according to other embodiments, the storage space provided for saving the files may have a different capacity. This storage space may for example be in the form of a micro-SD card or equivalent card housed in the micro-server. Of course, other types of storage means may be used without modifying the subject matter of the invention.

Preferably, the operating system and the various modules of the micro-server are saved on a dedicated memory, which is, for example, a memory associated with an electronic card housed in the micro-server.

Advantageously and according to the invention, the micro-server further comprises a secure housing that receives the components and modules of said micro-server and has a volume of less than 100 cm3.

A micro-server according to this variant is compact and takes up little space. In particular, a micro-server of this kind can fit in the pocket of a user, which facilitates the mobility of said user.

Advantageously and according to this variant, the micro-server has a weight of less than 120 g.

The invention also relates to a micro-server characterized in combination by all or some of the features mentioned above or below.

LIST OF DRAWINGS

Further aims, features and advantages of the invention will become apparent upon reading the following description, which is provided solely by way of non-limiting example, and which refers to the accompanying drawings, in which:

FIG. 1 is a schematic view of the operating principle of a micro-server according to the invention, FIG. 2 is a schematic view of a micro-server according to one embodiment of the invention.

DETAILED DESCRIPTION OF AN
EMBODIMENT OF THE INVENTION

For the sake of illustration and clarity, scales and proportions are not strictly adhered to in the drawings.

Moreover, identical, similar, or analogous elements are denoted using the same reference signs throughout the drawings.

FIG. 2 schematically illustrates a micro-server 10 according to the invention comprising a central processor 11, a random-access memory 12, a storage space 13 for computer files, and an operating system 32 configured to be able to control the central processor 11, the random-access memory 12, and the storage space 13.

According to a preferred embodiment, the micro-server comprises an electronic card formed of an Artik® module equipped with a microprocessor, a random-access memory, and a wireless controller that constitute the microprocessor 11, the random-access memory 12, and the sharing network controller 14, respectively.

The operating system 32 may be of any known type. According to a preferred embodiment, the system is a GNU/Linux system. The operating system allows the use of the functionalities of the various components of the micro-server and their interactions.

The storage space may also be of any type. According to one embodiment of the invention, said storage space 13 is in the form of a micro-SD card, for example having a capacity of 128 GB, it being understood that the storage capacity may be different in other embodiments of the invention.

The micro-server 10 also comprises a first controller for wireless access to said micro-server, called the sharing network controller 14. Said sharing controller 14 is configured, upon authorization, to allow a computer device 21, 22 of a user to be connected to the micro-server 10. The sharing network controller creates a wireless local sharing network for the purpose of connecting said computer device 21, 22 of a user to said micro-server 10. The local wireless network is, for example, of the IEEE802.11 (Wi-Fi) type.

Authorization of this connection results, for example, from user password authentication.

A micro-server 10 according to the invention therefore allows a wireless local network to be generated and distributed.

The micro-server 10 also comprises a second wireless access controller, called the configuration controller 15. Said configuration controller 15 is configured, upon authorization, to allow a computer device 25 of a privileged user to be connected to said micro-server, and to automatically synchronize predetermined files from said device 25 on the storage space 13 via the random-access memory 12.

The sharing network controller creates a wireless local configuration network for the purpose of connecting said computer device 25 of a privileged user to said micro-server 10. The wireless local configuration network is, for example, of the IEEE802.11 (Wi-Fi) type. The wireless local sharing network and the wireless local configuration network are two different networks and they are not connected to one another, in particular so as to prevent a user other than the privileged user from being able to synchronize files or data with the micro-server.

Authorization of the connection of the device 25 to the micro-server by means of the configuration controller results, for example, from user password authentication.

The micro-server therefore allows operation even in the absence of an Internet access network due to the centralization of the computer files on the storage space 13 and the presence of the sharing network controller 14.

The micro-server also comprises a management module 16 for managing packets of an IP network layer, said management module being embedded in the operating system 32 and configured to enable the use of an embedded web server (or any equivalent network service). This web server (or equivalent network service) is configured to be able to supply files from the storage space 13 to a web browser (or file system or any suitable module or targeted network service) hosted by a device 21, 22 of a user connected to the micro-server via the sharing controller 14. In other words, in the case where the network service is a web server, said web server makes it possible to provide content on a web browser of a device of a user connected to the micro-server 10 via the wireless sharing controller 14 to the micro-server 10.

A micro-server 10 according to this embodiment therefore allows for connection between different devices via the sharing network controller 14. The micro-server 10 can therefore deliver content to the various devices connected via the web browser, which allows horizontal operational compatibility between the devices without requiring prior configuration and/or installation.

The micro-server 10 also comprises a data encryption module 17. This encryption module 17 is configured to be able to encrypt, using a predetermined encryption key, all the data passing through the random-access memory 12 before said data are saved in the storage space 13.

A master encryption key is determined by the user when the micro-server is initialized. A series of multiple encryption keys generated as needed and not predetermined according to a parent/child relationship (such as the tree structure of a file system) follows.

This functionality is made possible by the database model used.

It also makes it possible to replicate all the data, in particular in a public cloud, without making them accessible to the host, the master encryption key remaining on the apparatus.

The micro-server 10 also comprises a battery 18, preferably a rechargeable battery, for powering the various components of the micro-server, and in particular the processor 11 and the configuration 15 and sharing 14 network controllers. According to one embodiment, the micro-server comprises a battery charger component which makes it possible to monitor the battery recharging process on an electrical network. A charging measurement can allow the user to know the remaining availability of the battery.

The micro-server 10 according to the invention also preferably comprises a time-stamping module 19 for said micro-server.

A time-stamping module 19 of this kind makes it possible to provide the micro-server with cryptographic time-stamping functions, such as digital signatures, proof of existence, and solutions based on digital certificates. This may for example be the use of security certificates required by communication protocols of the HTTPS type. These protocols can thus be implemented for data exchanges between the devices and the micro-server 10.

According to an advantageous embodiment, the micro-server further comprises a USB drive 31 that makes it possible to install the operating system 32 and the various software routines of the micro-server.

Preferably, the micro-server 10 according to the invention comprises a secure housing that receives all of the components of the micro-server. A housing of this kind is for example formed so as to have a volume of less than 100 cm3.

FIG. 1 very schematically illustrates the operating principle of the micro-server 10.

A device 25 of a privileged user, that is to say of the user on the move who owns the micro-server, can connect to the micro-server via the wireless configuration controller 15. This connection makes it possible to synchronize data from the device 25 with the storage space 13 and to encrypt the data by means of the encryption module 17 and the passage of the data through the random-access memory 12.

The devices 21, 22 can also connect to the micro-server via the wireless controller 14 in order to be able to access the data in the storage space. This connection of the devices 21, 22 to the micro-server 10 does not require the presence of a local Wi-Fi network since it is the micro-server which generates the wireless network. The data of the storage space 13 are shared with the devices 21, 22 by means of the server 16 embedded in the operating system 32.

The invention claimed is:

1. A portable, autonomous, and secure micro-server for collaboration between different users, comprising:
    a central processor,
    a random-access memory,
    a storage space for computer files,
    an operating system configured to be able to control said central processor, said random-access memory, and said storage space,
    a sharing network controller adapted for wireless access to said micro-server, and configured to create a wireless local sharing network and, upon authorization, to allow a computer device of a user to be connected to said micro-server via the wireless local sharing network,
    a configuration network controller adapted for wireless access to said micro-server, and configured to create a wireless local configuration network and, upon authorization, to allow a computer device of a privileged user to be connected to said micro-server via the wireless local configuration network, to automatically synchronize predetermined files from a device of said privileged user on said storage space of said micro-server via said random-access memory, said wireless local sharing network and said wireless local configuration network being two different networks and not connected to one another,
    a management module for managing packets from an IP network layer, said management module being embedded in said operating system and configured to enable the use of a network service of a layer higher than said IP network layer which enables files to be supplied from the storage space to said network service hosted by a device of a user connected to said micro-server via said sharing controller, and
    a data encryption module, configured to be able to encrypt, using a predetermined encryption key, all the data passing through said random-access memory before said data are saved in said storage space.

2. The micro-server according to claim 1, further comprising a rechargeable battery for powering said processor and said configuration network controller and sharing network controllers.

3. The micro-server according to claim 1, further comprising a time-stamping module for said micro-server.

4. The micro-server according to claim 1, further comprising means for authenticating the connections of the devices of the users soliciting said sharing network controller.

5. The micro-server according to claim 1, wherein said storage space has a capacity of one hundred twenty eight (128) gigabytes (GB).

6. The micro-server according to claim 1, further comprising a secure housing that receives the components and modules of said micro-server and has a volume of less than one hundred cubic centimeters (100 cm3).

7. The micro-server according to claim 1, wherein the micro-server has a weight of less than one hundred and twenty grains (120 g).

* * * * *